(12) United States Patent
Berkcan et al.

(10) Patent No.: US 9,746,583 B2
(45) Date of Patent: Aug. 29, 2017

(54) GAS WELL INTEGRITY INSPECTION SYSTEM

(71) Applicant: General Electric Company, Schenectady, NY (US)

(72) Inventors: Ertugrul Berkcan, Clifton Park, NY (US); John Scott Price, Niskayuna, NY (US); Edward James Nieters, Burnt Hills, NY (US); William Robert Ross, Rotterdam, NY (US); Clifford Bueno, Clifton Park, NY (US); Yuri Alexeyevich Plotnikov, Niskayuna, NY (US); Susanne Madeline Lee, Cohoes, NY (US)

( * ) Notice: Subject to any disclaimer, the term of this patent is extended or adjusted under 35 U.S.C. 154(b) by 276 days.

(21) Appl. No.: 14/470,348

(22) Filed: Aug. 27, 2014

(65) Prior Publication Data

US 2016/0061991 A1 Mar. 3, 2016

(51) Int. Cl.
*G01V 5/14* (2006.01)

(52) U.S. Cl.
CPC .................. *G01V 5/145* (2013.01)

(58) Field of Classification Search
CPC .................. G01V 5/04–5/145; H01J 35/14
See application file for complete search history.

(56) References Cited

U.S. PATENT DOCUMENTS

| | | |
|---|---|---|
| 4,918,315 A | 4/1990 | Gomberg et al. |
| 5,557,108 A | 9/1996 | Tumer |
| 5,838,759 A | 11/1998 | Armistead |

(Continued)

FOREIGN PATENT DOCUMENTS

| | | |
|---|---|---|
| EP | 2275840 A1 | 1/2011 |
| WO | 9613839 A1 | 5/1996 |
| WO | 2011127156 A2 | 10/2011 |

OTHER PUBLICATIONS

"Integrated Neutron/X-Ray In-Port Surveillance System for Ships", Applied Signal Technology, Inc., 2003.

(Continued)

*Primary Examiner* — Huy Q Phan
*Assistant Examiner* — David Frederiksen
(74) *Attorney, Agent, or Firm* — Nitin N Joshi (57) ABSTRACT

A well integrity inspection system configured to inspect a well structure including multiple concentric layers. The well integrity inspection system includes an inspection probe positioned in the well structure. The inspection probe includes a plurality of excitation assemblies for transmitting a plurality of radiation emissions into the well structure. The plurality of excitation assemblies includes at least a neutron excitation assembly and an X-ray excitation assembly. The inspection probe also includes a plurality of detection assemblies configured to receive a plurality of backscatter radiation returns from the well structure. The plurality of detection assemblies includes at least a neutron detection assembly and an X-ray detection assembly. The well integrity inspection system further including a processor operatively coupled to the inspection probe. The processor is configured to determine a well integrity parameter of the well structure based on at least one of the plurality of backscatter radiation returns.

16 Claims, 5 Drawing Sheets

(56) References Cited

U.S. PATENT DOCUMENTS

| | | | | |
|---|---|---|---|---|
| 6,297,507 | B1* | 10/2001 | Chen | G01V 5/08 250/269.1 |
| 6,552,333 | B1* | 4/2003 | Storm | G01V 5/12 250/265 |
| 7,334,465 | B2 | 2/2008 | Smits et al. | |
| 7,864,920 | B2 | 1/2011 | Rothschild | |
| 8,138,471 | B1 | 3/2012 | Shedlock et al. | |
| 8,374,310 | B2 | 2/2013 | Kang et al. | |
| 9,267,359 | B2* | 2/2016 | Smaardyk | E21B 43/04 |
| 2008/0116365 | A1* | 5/2008 | Flecker | G01V 5/12 250/261 |
| 2010/0017134 | A1* | 1/2010 | Steinman | E21B 43/04 702/8 |
| 2011/0012015 | A1* | 1/2011 | Evans | G01V 5/14 250/269.2 |
| 2011/0284731 | A1* | 11/2011 | Roscoe | G01V 5/101 250/269.3 |
| 2012/0155592 | A1 | 6/2012 | Gozani et al. | |
| 2014/0034823 | A1* | 2/2014 | Hyde-Barber | C04B 28/02 250/269.4 |
| 2015/0177409 | A1* | 6/2015 | Sofiienko | G01V 5/125 250/269.1 |

OTHER PUBLICATIONS

Ipe et al., "An Airport Cargo Inspection System Based on X-Ray and Thermal Neutron Analysis (TNA)", Radiat Prot Dosimetry, vol. 116, Issue 1-4, pp. 347-351, 2005.

Ringermacher et al., "Quantitative evaluation of discrete failure events in composites using infrared imaging and acoustic emission", NDT & E, vol. 22, Issue 2-3, pp. 93-99, 2007.

PCT Search Report and Written Opinion issued in connection with corresponding PCT Application No. PCT/US15/043512 on Nov. 16, 2015.

* cited by examiner

GAS WELL INTEGRITY INSPECTION SYSTEM

BACKGROUND

The field of the disclosure relates generally to methods and systems for inspecting gas well integrity, and more specifically to methods and systems for inspecting gas well integrity using a neutron and X-ray based inspection system.

In recent years, innovative production techniques have allowed access to oil and gas reserves previously considered inaccessible. Protecting the surrounding environment and assuring the long-term integrity of such wells are critical tasks for the oil and gas industry. Significant effort is devoted by the industry toward ensuring a safe and long operational life for all components of the oil and gas production and delivery infrastructure. Material degradation, defects on the installed tubular systems, shifts of ground formations, and other factors could lead to gas leakage, ground contamination, and potentially catastrophic consequences. Periodic, accurate, and complete inspections of the existing production infrastructure are an essential component of modern oil and gas industry maintenance strategy, addressing both operational safety, as well as water and ecosystem sustainability concerns. These concerns are of extreme relevance to communities located in areas of shale gas development, as well as for the nation as a whole.

The ability to inspect casings outside the innermost production casing in gas wells is a major issue for the industry. No technology currently exists that is capable of 'seeing' through inner casings in order to establish the integrity of the equipment outside of the wellbore. In particular, a major technology gap exists in so far as measuring the integrity of multiple well casing and cement annuli at intermediate-to-surface depths along major aquifers and ground water zones, where cracks, corrosion, and disbonding occur.

Known acoustic imaging technology with cement bond logs and variable density logs (CBL/VDL) is able to evaluate a single walled structure consisting of a single casing with bonded cement. However, this known acoustic imaging technology is not capable of inspecting multiple annuli in an intermediate zone where there are 2 to 5 stacked casing/cement rings. Furthermore, ultrasound-based techniques do not traditionally operate in gas filled wellbores and rely on using the drilling mud as a couplant for higher frequency sound for improved resolution.

Known electromagnetic inspection tools are sensitive only to the damages in metallic structures. Magnetic Flux Leakage (MFL) uses pipe wall magnetic saturation and magnetic sensors to detect variations in local magnetic field due to cracks and pit corrosion. However, systems that use MFL for crack detection can be used to inspect only the innermost wellbore pipe. Furthermore, eddy current tools rely on measuring the excitation of metallic components with an alternating electromagnetic field, which depends strongly on pipe electrical and magnetic properties and the cross-sectional area of the conductive material. However, eddy current sensors suffer from local variations in magnetic permeability that reduce the signal-to-noise ratio and require larger sensors. As a result, eddy current sensors have low spatial resolution.

BRIEF DESCRIPTION

In one aspect, a well integrity inspection system configured to inspect a well structure having multiple concentric layers is provided. The well integrity inspection system includes an inspection probe positioned in the well structure. The inspection probe includes a plurality of excitation assemblies for transmitting a plurality of radiation emissions into the well structure. The plurality of excitation assemblies includes at least a neutron excitation assembly and an X-ray excitation assembly. The inspection probe also includes a plurality of detection assemblies configured to receive a plurality of backscatter radiation returns from the well structure. The plurality of detection assemblies includes at least a neutron detection assembly and an X-ray detection assembly. The well integrity inspection system further includes a processor operatively coupled to the inspection probe. The processor is configured to determine a well integrity parameter of the well structure based on at least one of the plurality of backscatter radiation returns.

In another aspect, an inspection probe for interrogating the integrity of a well structure having a plurality of alternating concentric casings and stabilizer regions is provided. The inspection probe includes a neutron excitation assembly configured to transmit a beam of neutrons into the well structure and an X-ray excitation assembly configured to transmit a beam of X-rays into the well structure. The inspection probe also includes a neutron detection assembly configured to receive a plurality of backscatter neutrons from the well structure and an X-ray detection assembly configured to receive a plurality of backscatter X-rays from the well structure.

In yet another aspect, a method of interrogating the integrity of a well structure having a plurality of alternating concentric casings and stabilizer regions is provided. The method includes inserting an inspection probe into an innermost casing of the well structure and transmitting a plurality of radiation emissions into the well structure using a plurality of excitation assemblies. The plurality of excitation assemblies includes at least a neutron excitation assembly and an X-ray excitation assembly. The method also includes receiving a plurality of backscatter radiation returns from the well structure using a plurality of excitation detection assemblies. The plurality of detection assemblies includes at least a neutron detection assembly and an X-ray detection assembly. A well integrity parameter of the well structure is determined, using a processor that is operatively coupled to the inspection probe, based on at least one of the plurality of backscatter radiation returns

DRAWINGS

These and other features, aspects, and advantages of the present disclosure will become better understood when the following detailed description is read with reference to the accompanying drawings in which like characters represent like parts throughout the drawings, wherein.

Unless otherwise indicated, the drawings provided herein are meant to illustrate features of embodiments of this disclosure. These features are believed to be applicable in a wide variety of systems comprising one or more embodiments of this disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations are combined and interchanged, such ranges are identified and include all the sub-ranges contained therein unless context or language indicates otherwise.

As used herein, the terms "processor" and "computer" and related terms, e.g., "processing device", "computing device", "central processing unit (CPU)", and "controller" are not limited to just those integrated circuits referred to in the art as a computer, but broadly refers to a microcontroller, a microcomputer, a programmable logic controller (PLC), an application specific integrated circuit, and other programmable circuits, and these terms are used interchangeably herein. In the embodiments described herein, memory may include, but is not limited to, a computer-readable medium, such as a random access memory (RAM), and a computer-readable non-volatile medium, such as flash memory. Alternatively, a floppy disk, a compact disc-read only memory (CD-ROM), a magneto-optical disk (MOD), and a digital versatile disc (DVD) may also be used. Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

Described herein is a well integrity inspection system configured to inspect a well structure having multiple concentric layers. The well integrity inspection system includes an inspection probe positioned in the well structure. The inspection probe includes a plurality of interrogation modalities that each have their own excitation assembly for transmitting a plurality of emissions into the well structure. At least two of the modalities include a neutron excitation assembly and a X-ray excitation assembly that are configured to interrogate radially outer layers of the well structure. The inspection probe also includes a plurality of detection assemblies configured to receive a plurality of return signals from the well structure. The plurality of detection assemblies includes at least a neutron detection assembly and an X-ray detection assembly that each receive backscatter radiation returns that have been modulated by the well structure. Data from the neutron detection assembly and the X-ray detection assembly is combined with data from at least one interrogation modality, such as, but not limited to, pulsed eddy currents, magnetic flux generation, and acoustic interrogation, to determine the integrity of the well structure.

Figure 1:
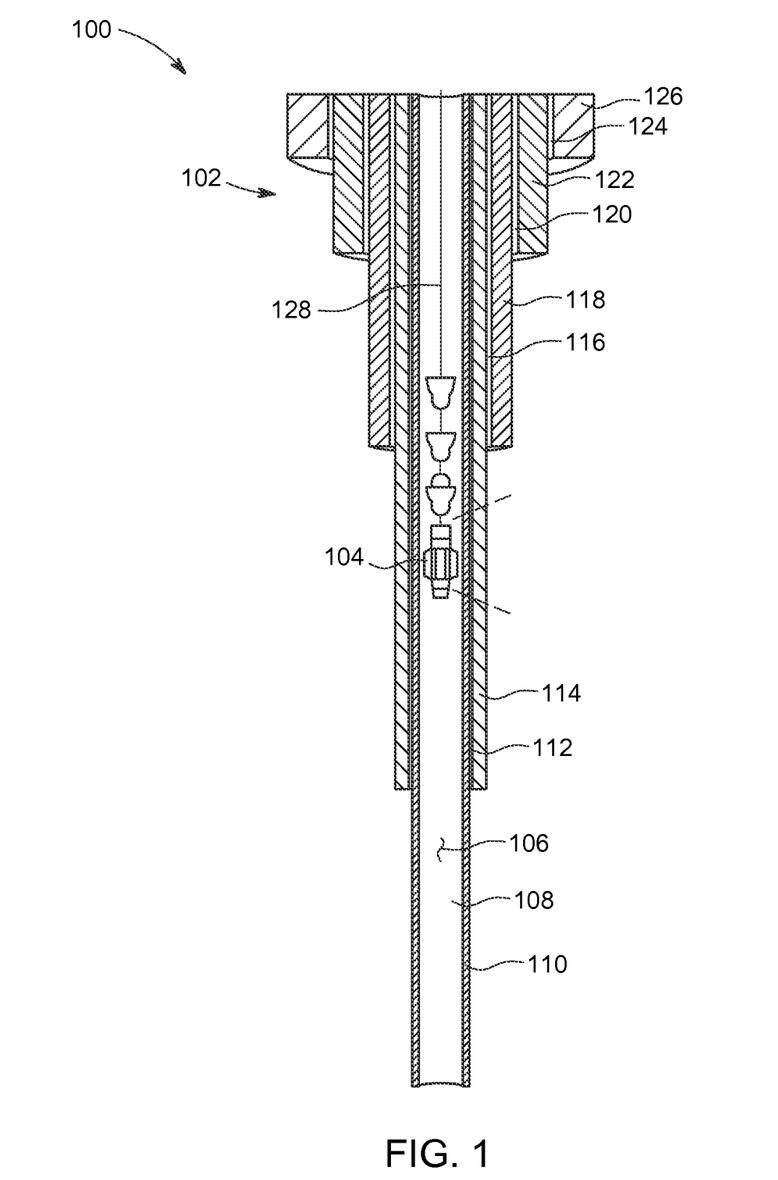
FIG. 1 is a partial cross-sectional view of a well integrity inspection system illustrating a well structure and an inspection probe.

FIG. 1 is a partial cross-sectional view of a well integrity inspection system 100 illustrating a well structure 102 and an inspection probe 104. In the exemplary embodiment, system 100 provides enhanced information about the flaw structure and topology of conventional and unconventional gas wells. More specifically, system 100 performs measurements of resistivity, neutron porosity, formation bulk density, formation photoelectric factor and natural gamma-ray radiation using various methods of inspection to determine the status of well structure 102. In the exemplary embodiment well structure 102 includes a central fluid flow conduit 106 and plurality of alternating casings and stabilizer regions circumscribing fluid flow conduit 106. More specifically, beginning with the immediately adjacent layer and moving radially outwards, fluid flow conduit 106 is circumscribed by a production casing 108, a production stabilizer 110, an intermediate casing 112, an intermediate stabilizer 114, a surface casing 116, a surface stabilizer 118, a conductor casing 120, a conductor stabilizer 122, an outer casing 124, and an outer stabilizer 126. In the exemplary embodiment, each casing 108, 112, 116, 120, and 124 is formed from a metallic material and each stabilizer 110, 114, 118, 122, and 126 is formed from concrete or cement.

Inspection probe 104 is lowered into fluid flow conduit 106 by a line 128 for inspection of well structure 102. In the exemplary embodiment, inspection probe 104 is configured to interrogate each of casings 108, 112, 116, 120, and 124 and stabilizer regions 110, 114, 118, 122, and 126 using a combination of inspection modalities to obtain results which are intrinsically more accurate than those provided by a single inspection mode. Traditionally, as described above, inspection of radially outer layers of casing and stabilizer was difficult in shallower sections of well structure 102 where multiple layers of casing and stabilizer reside. However, inspection probe 104 includes a dual-mode imaging technique that collects imaging information obtained from X-ray and neutron backscatter and algorithmically fuses this data with complementary information obtained from well-established modalities, based on electromagnetic and acoustic principles, as described in further detail below.

Figure 2:
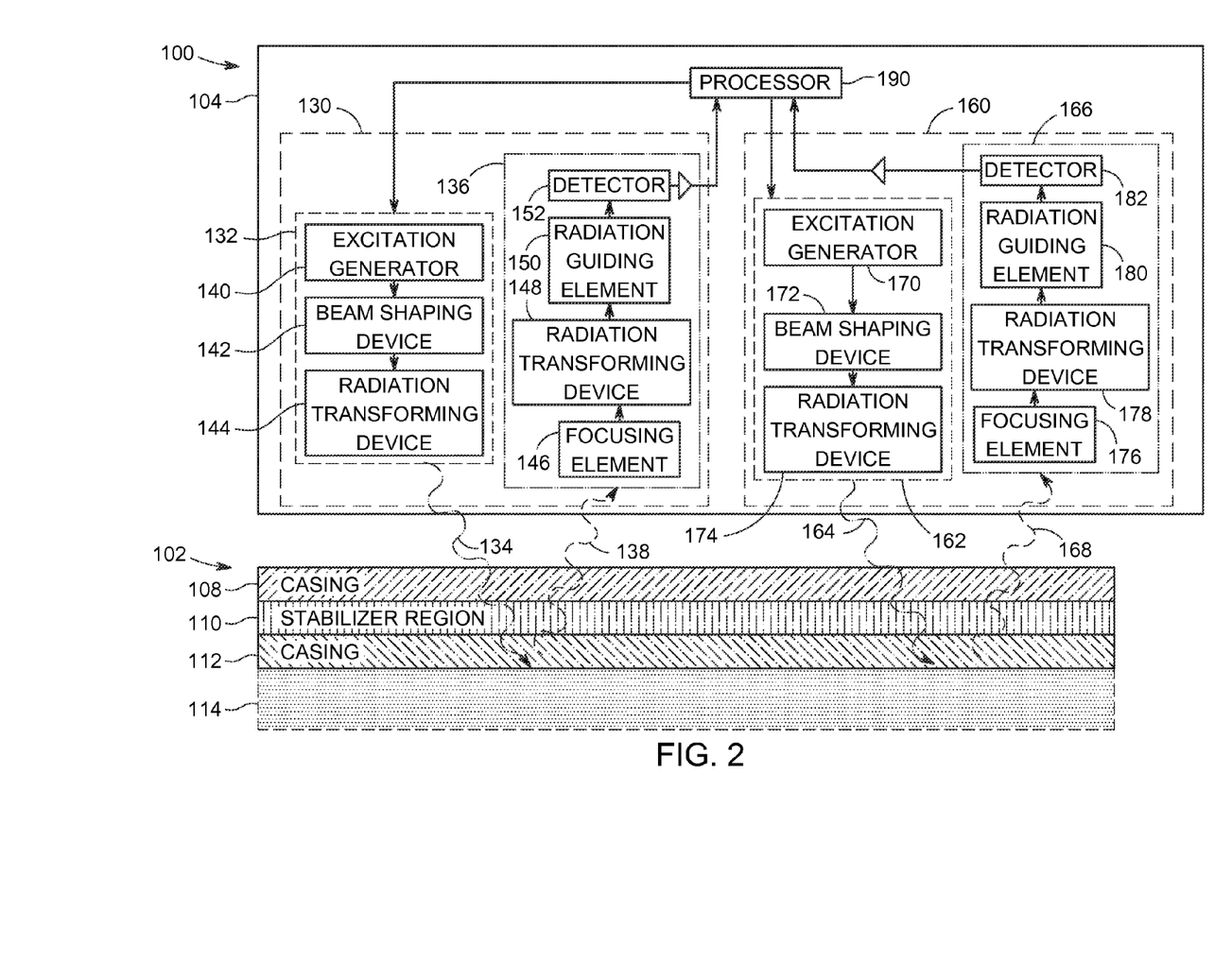
FIG. 2 is a schematic diagram of the inspection probe and the well structure that may be used with the well integrity inspection system shown in FIG. 1.
Figure 3:
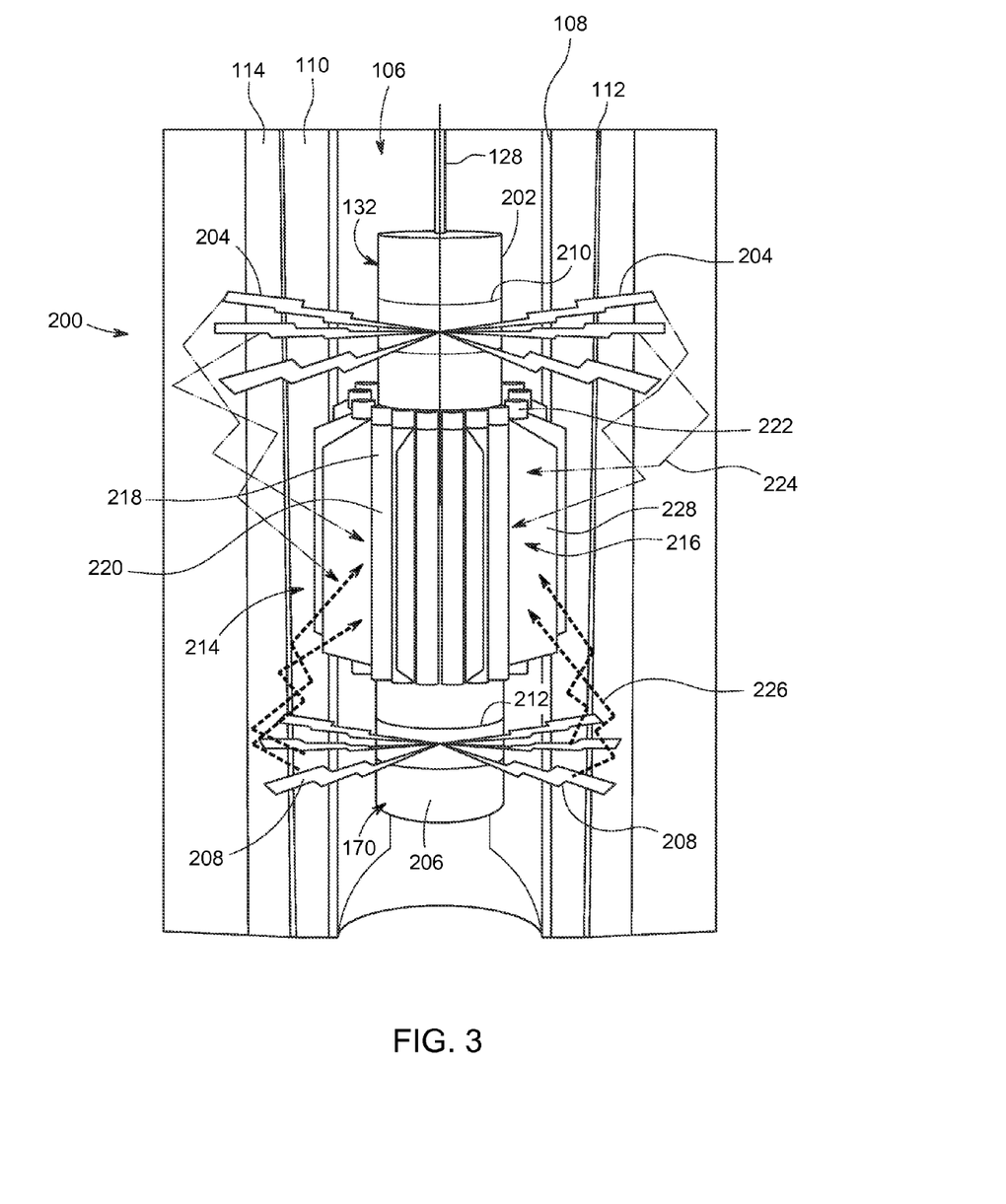
FIG. 3 is a perspective view of an exemplary inspection probe that may be used with the well integrity inspection system shown in FIG. 1.

FIG. 2 is a schematic diagram of inspection probe 104 and well structure 102 of well integrity inspection system 100. FIG. 3 is a perspective view of an exemplary inspection probe 200 that may be used with well integrity inspection system 100. In the exemplary embodiment, inspection probe 104 includes a plurality of inspection modalities including a first inspection modality 130 and a second inspection modality 160 for interrogating well structure 102. In the exemplary embodiment, first inspection modality 130 includes a first excitation assembly 132 configured to transmit a plurality of shaped radiation emissions 134 into well structure 102. First modality 130 also includes a first detection assembly 136 configured to receive a plurality of modulated backscatter radiation returns 138 from well structure 102. Similarly, second inspection modality 160 includes a second excitation assembly 162 configured to transmit a plurality of shaped radiation emissions 164 into well structure 102. Second modality 160 also includes a second detection assembly 166 configured to receive a plurality of modulated backscatter radiation returns 168 from well structure 102. In the exemplary embodiment, first modality 130 is a neutron interrogation device and second modality 160 is an X-ray interrogation device. More specifically, first excitation assembly 132 is a neutron excitation assembly and first detection assembly 136 is a neutron detection assembly. Similarly, second excitation assembly 162 is an X-ray excitation assembly and second detection assembly 166 is an X-ray detection assembly. In the exemplary embodiment, neutron interrogation device 130 and X-ray interrogation device 160 share a common detection assembly 136 or 166 such that common detection assembly 136 or 166 detects modulated backscatter radiation returns from both neutron excitation assembly 132 and X-ray excitation assembly 162. Alternatively, neutron interrogation device 130 and X-ray interrogation device 160 have separate and distinct detection assemblies.

Well integrity inspection system 100 also includes a processor 190 operatively coupled to inspection probe 104 and configured to determine a well integrity parameter of well structure 102 based on at least one of the plurality of backscatter radiation returns 138 and 168. In the exemplary embodiment, as shown in FIG. 2, processor 190 is integrated with modalities 130 and 160 on inspection probe 104. Alternatively, processor 190 is an element of well integrity inspection system 100 that is separate from inspection probe 104.

In the exemplary embodiment, neutron device 130 and X-ray device 160 utilize neutron and X-ray backscatter detection techniques to interrogate the outer layers of well structure 102 to determine the status of one or more layer of well structure 102. More specifically, each of neutron device 130 and X-ray device 160 transmit a plurality of shaped radiation emissions into plurality of casings 108, 112, 116, 120, and 124 and stabilizer regions 110, 114, 118, 122, and 126 to determine a well integrity parameter of well structure 102.

In the exemplary embodiment, neutron excitation assembly 132 includes an excitation generator 140, a beam shaping device 142, and a radiation transforming device 144. Furthermore, neutron detection assembly 136 includes a radiation focusing element 146, a radiation transforming device 148, a radiation guiding element 150, and a radiation detector 152. Similarly, X-ray excitation assembly 162 includes an excitation generator 170, a beam shaping device 172, and a radiation transforming device 174. Furthermore, X-ray detection assembly 166 includes a radiation focusing element 176, a radiation transforming device 178, a radiation guiding element 180, and a radiation detector 182. In another exemplary embodiment, the radiation guiding element 150 is coated with at least one layer of at least one material that enable total internal reflection of the radiation to enhance the radiation guiding ability; an exemplary enhancement is obtained as a focusing of the radiation. In one particular embodiment, focusing components 176 are used as part of radiation guiding element 150, where radiation guiding elements 150 are coated with reflective multiple layers of material to enable total internal reflection to align backscatter radiation returns 168 and guide backscatter radiation returns 168 toward radiation transforming device 178. These materials may include, but are not limited to boron, carbon, nickel, tungsten, iridium, osmium gold, molybdenum, chromium, $SiO_2$, $B_4C$, $Al_2O_3$, and silicon. Typical number of multilayers may be of the order of 100-10,000.

Excitation generator 140 is a neutron generator 202 configured to transmit at least one beam 204 of neutrons in a distribution such that beam 204 penetrates at least casings 108 and 112 and stabilizers 110 and 114. In the exemplary embodiment, neutron generator 202 is a 2.5 MeV (Mega electron volts) fusion neutron generator sized to fit into slimline boreholes with a diameter of less than 2 inches. Generator 202 is meant to replace radioactive chemical sources and tritium-based generators for wireline applications. Furthermore, generator 202 is operable at 20,000 psi (pounds per square inch) pressure and 150° C. (degrees Celsius) temperature, with survivability to 175° C. for deep bore applications. Alternatively, neutron generator 202 is any type of neutron generator that facilitates operation of inspection probe 200 as described herein.

Excitation generator 170 is an X-ray generator 206 configured to transmit at least one beam 208 of X-rays in a distribution such that beam 208 penetrates at least casings 108 and 112 and stabilizers 110 and 114. In the exemplary embodiment, X-ray generator 206 is an electrically-powered source of high energy X-rays capable of withstanding the demanding environment of well integrity sensing. Furthermore, X-ray generator 206 is a fixed anode X-ray source capable of producing higher flux beams than conventional radionuclide sources, while providing the additional benefits of controllable X-ray beam intensity and minimal safety issues. In one exemplary embodiment, X-ray generator 206 is meant to replace the currently-used γ-ray emitting radioisotopes. While radionuclide sources are small in size, mono-energetic, fairly stable, and require no power input, they require strict licensing and inventory management due to the security concerns surrounding radioactivity. Alternatively, X-ray generator 206 is any type of X-ray generator that facilitates operation of inspection probe 200 as described herein. Additionally, an advantage compared to radioisotopes, X-ray generator 206 can be pulsed on and off to better distinguish interrogating signals from other noise. Further, the output of X-ray generator 206 can be raised and lowered in intensity to match the interrogation task at hand (thicker vs. thinner, large diameter casings vs. smaller diameter casings).

In the exemplary embodiment, neutron excitation assembly 132 includes a beam shaping device 210, such as beam shaping device 142. Furthermore, X-ray excitation assembly 162 includes a beam shaping device 212, such as beam shaping device 172. In the exemplary embodiment, beam shaping device 210 is substantially similar to beam shaping device 212. Alternatively, beam shaping devices 210 and 212 are different from one another. Beam shaping devices 210 and 212 are configured to narrow beams 204 and 208, respectively, to facilitate transmission of beams 204 and 208 along a predetermined path defined by predetermined altitude and azimuthal angles. Beam shaping devices 210 and 212 shape beams 204 and 208 by substantially limiting transmission of beams 204 and 208 other than along the predetermined path. In the exemplary embodiment, beam shaping devices 210 and 212 are configured to narrow transmission of beams 204 and 208 to a predetermined path of an altitude angle in a range of between approximately 5 degrees and approximately 90 degrees and an azimuthal angle in a range of between approximately 5 degrees and approximately 90 degrees. Alternatively, beam shaping devices 210 and 212 are configured to narrow transmission of beams 204 and 208 to a predetermined path having any altitude angle and any azimuthal angle that facilitates operation of inspection probe 200 as described herein.

As described above, in the exemplary embodiment, inspection probe 200 includes a single detection assembly 214 that acts as both neutron detection assembly 136 and X-ray detection assembly 166. As such, radiation focusing elements 146 and 176 are embodied in a single collimator device 216; radiation transforming devices 148 and 178 are embodied in a single scintillator material 218; radiation guiding elements 150 and 180 are embodied in a plurality of waveguides 220; and radiation detectors 152 and 182 are embodied in a plurality of detectors 222. Alternatively, inspection probe 200 may include separate and distinct detection assemblies for each of neutron interrogation device 130 and X-ray interrogation device 160. In another exemplary embodiment, radiation transforming devices 148 and 178 take simple forms or may be forgone to enable a direct detection approach by detectors 152 and 182.

In the exemplary embodiment, detection assembly 214 is configured to collect and analyze a plurality of modulated backscatter neutrons 224 and a plurality of backscatter X-rays 226 that impinge upon well structure 102 and return to inspection probe 200. Collimator device 216 includes a plurality of circumferentially-spaced vertical fins 228 that are configured to collect backscatter neutrons 224 and X-rays 226 from a predetermined area of well structure 102 by aligning backscatter neutrons 224 and X-rays 226 and guiding them towards scintillator material 218. In the exemplary embodiment, scintillator material 218 extends about each waveguide 220 and is configured to transform the plurality of high energy backscatter neutrons 224 and X-rays 226 into a plurality of low energy radiation (not shown) for receipt and analysis by detector 222. Scintillation occurs within scintillation material 218 and the low energy radiation is channeled along waveguides 220 to a detector 222. In the exemplary embodiment, waveguides 220 are optical fibers coated in scintillator material 218. In another exemplary embodiment, in addition to a coating of scintillating material 218 that guides the low energy radiation to detectors 222, fiber optic guiding material 220 may be scintillating fibers that offer high detection quantum efficiency while maintaining spatial resolution of the back scattered radiation. Additionally, this scintillating fiber optic component may be either a thick glassy material populated with heavy elements such as Barium, and rare earth elements to optimally absorb back scattered X-ray radiation, or contain an additional component of gadolinium to optimally absorb the back scattered neutrons. It can be seen by those conversant in the state of the art that the same scintillator can then absorb either x-rays or neutrons to obtain exact registration via alternate pulsing of the radiation.

In the exemplary embodiment, each detector 222 is coupled at an end of a respective waveguide 220 such that the detector 222 receives low energy radiation only from the waveguide associated therewith. As such, each detector 222 receives low energy radiation that is produced at any point along a length of scintillator material 218 or waveguides 220. In another exemplary embodiment, shields (not shown) are used to prevent backscattered radiation from impinging directly on detector 222. In an alternative embodiment, collimator fins 228 are oriented substantially horizontally with respect to well structure 102 and each detector 222 is associated with a space between adjacent fins 228. As such, each detector 222 receives low energy radiation resulting from backscatter neutrons 224 and X-rays 226 originating from different radial depths of well structure 102 when beams 204 and 208 are transmitted from generators 202 and 206, respectively, at a predetermined angle. Each detector 222 receives the low energy radiation from a respective waveguide 220 and transmits data associated with the low energy radiation to processor 190 (shown in FIG. 2) for analysis that may be carried out on a detector by detector basis and also as a function of radial depth of well structure 102.

As data is collected by detection assembly 214, the recorded signals representative of the low energy radiation are compared to one another as a function of the scanning depth of inspection probe 200. Such analysis determines any change in the integrity of well structure 102 both radially and vertically. The integrity of well structure 102, including the status of a plurality of integrity parameters, is determined by the intensity of backscatter radiation 224 and 226 that returns from well structure 102 after interrogation by inspection probe 200. Defects in well structure 102 are detectable by measuring fluctuations in neutron and X-ray backscatter radiation returns 224 and 226 as inspection probe 200 descends along fluid flow channel 106. Accuracy of the well structure integrity determination may be improved by at least increasing the exposure time of detection system 214 to backscatter radiation returns 224 and 226, and also by increasing the intensity of radiation emissions 204 and 208 from generators 202 and 206, respectively.

Figure 4:
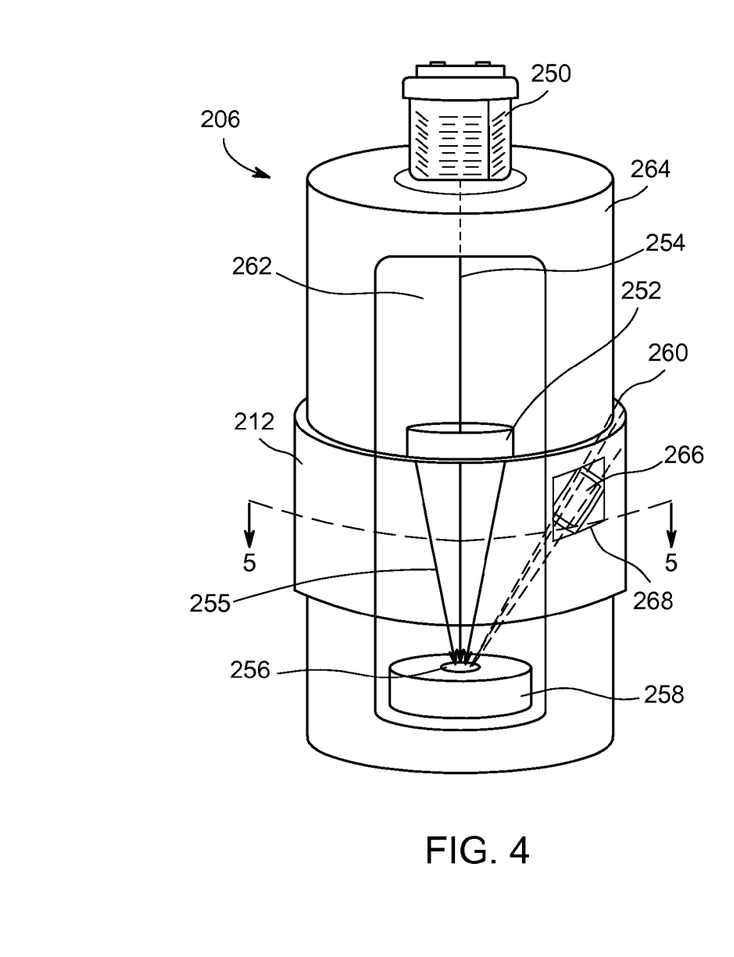
FIG. 4 is a perspective view of an alternative inspection probe that may be used with the well integrity inspection system shown in FIG. 1.
Figure 5:
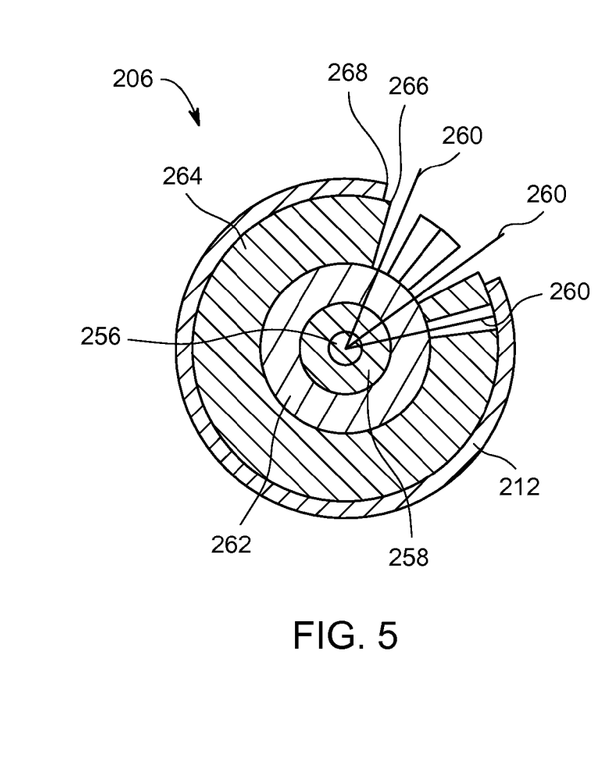
FIG. 5 is a cross-sectional view of the inspection probe shown in FIG. 4 taken along line 5-5.

FIG. 4 is a perspective view of X-ray generator 206 of inspection probe 200 that may be used with well integrity inspection system 100, and FIG. 5 is a cross-sectional view of X-ray generator 206 taken along line 5-5 in FIG. 4. As described above, X-ray generator 206 includes beam shaping device 212. In the exemplary embodiment, beam shaping device 212 includes a rotating sleeve configured to circumscribe X-ray generator 206. Although X-ray generator 206 is shown with sleeve 212, neutron generator 202 may also include a rotating sleeve as its beam shaping device 210. Alternatively, beam shaping device 210 may be any shaping device other than a rotating sleeve that enables operation of inspection probe 200 as described herein.

In the exemplary embodiment, generator 206 includes a generation device 250 places a high negative electrical potential on a cathode 252 by means of an electrical conductor 254. Cathode 252 focuses beam of electrons 255 onto a focal point 256 of an X-ray production target 258. As beam 255 impacts target 258, a plurality of X-rays 260 are emitted for interrogation of well structure 102 (shown in FIG. 1). More specifically, X-rays 260 are emitted in a route for interrogation of well structure 102. Cathode 252 and target 258 are positioned within a vacuum vessel 262, which is positioned within a pressure vessel 264. A portion of pressure vessel 264 has been shown removed in FIG. 4 to enable viewing access to beam 255. In another embodiment, X-rays 260 are emitted in a substantially omni-directional route for interrogation of well structure 102 (not shown in FIG. 3)

Vacuum vessel 262 is formed from a material that is partially penetrable by X-rays 260, such as, but not limited to, glass, metal, or thin-walled metal such as stainless steel or aluminum. Pressure vessel 264 is formed from a material that is impervious to X-rays, such as, but not limited to, thick (greater or equal to 25 mm) steel, titanium, or other metals and metal alloy. Pressure vessel 264 includes a plurality of pressure sealed windows 266 that enable X-rays 260 to penetrate therethrough with modest attenuation. Shaping device 212 is also formed from a material that is impervious to X-rays 260 and also includes a plurality of windows 268 that enable X-rays 260 to penetrate therethrough. In the exemplary embodiment, beam shaping device 212 is configured to rotate such that only when a window 268 of device 212 is aligned with a window 266 of vessel 264 will X-rays 260 be emitted from X-ray generator 206. For example, as shown in FIG. 5, X-rays 260 that are aligned with windows 266 penetrate pressure vessel 264 but are limited from further travel by shaping device 212. However, when windows 266 and 268 are aligned, X-rays 260 pass through both pressure vessel 264 and beam shaping device 212. Although FIGS. 4 and 5 show a limited number of windows 266 and 268, X-ray generator 206 has any number of windows 266 and 268 that facilitates operation of inspection probe 200 as described herein. As such, beam shaping device 212 is configured to facilitate transmission of X-rays 260 along a predetermined path by substantially limiting transmission of X-rays 260 other than through windows 266 and 268 along the predetermined path. In the exemplary embodiment, rotation of beam shaping device 212 is synched with generator device 250 and detection assembly 214 such that X-rays 260 are transmitted along a predetermined path to enable accurate interrogation.

Figure 6:
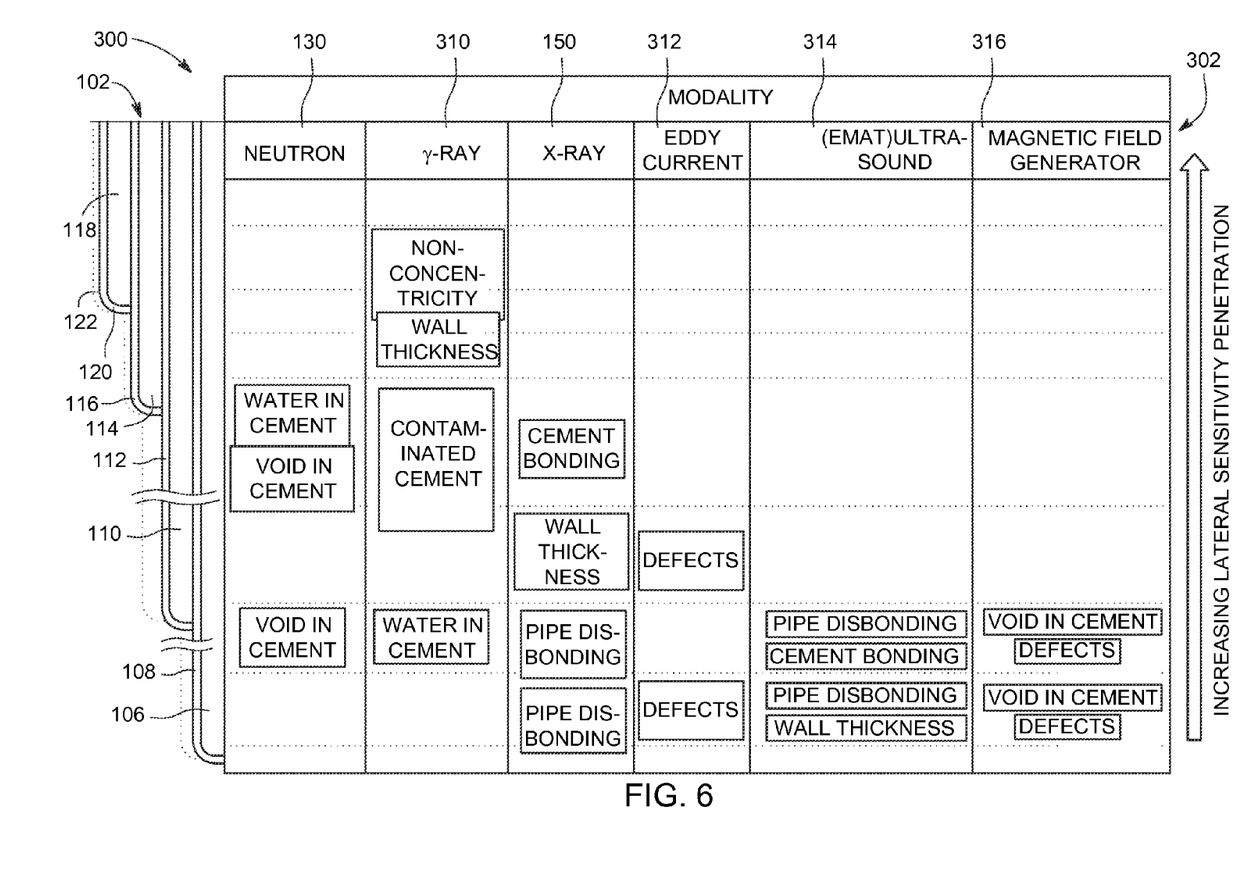
FIG. 6 is a chart illustrating regions of effectiveness for various inspection modes of the well integrity inspection system shown in FIG. 1.

FIG. 6 is a chart 300 illustrating regions of effectiveness for various inspection modes of well integrity inspection system 100. As described above, well integrity inspection system 100 includes a plurality of modalities 302, each having an independent excitation assembly to interrogate well structure 102. Data from each modality 302 is combined and used to determine the status of a well integrity parameter. Neutron and X-ray modalities 130 and 160 are described above. In the exemplary embodiment, well integrity inspection system 100 includes at least one of a gamma ray modality 310, an eddy current pulse modality 312, an ultrasound modality 314, and a magnetic field generator modality 316. Well structure 102 is shown on the left side of chart 300 to illustrate which modality 302 enables testing of which integrity parameter at a specific depth down fluid flow conduit 106. As shown on the right side of chart 300, as the number of layers of casings and stabilizers increases, so does the lateral sensitivity required to penetrate well structure 102 and interrogate casings 112, 116, 120, and 124 and stabilizers 114, 116, 118, 122, and 126.

In the exemplary embodiment, well integrity inspection system 100 is configured to detect a plurality of defects in well structure 102 to determine the integrity of well structure 102. More specifically, well integrity inspection system 100 is configured to detect at least the following defects: 1) the presence of water in one of stabilizers 110, 114, 116, 118, 122, and 126; 2) a void in the material of stabilizers 110, 114, 116, 118, 122, and 126; 3) separation of one of casings 108, 112, 116, 120, and 124 from an adjacent stabilizer 110, 114, 116, 118, 122, and 126; 4) whether one of stabilizers 110, 114, 116, 118, 122, and 126 is contaminated; 5) a thickness of at least one of casings 108, 112, 116, 120, and 124 and/or a thickness of at least one of stabilizers 110, 114, 116, 118, 122, and 126; and 6) a deviation from concentricity of any of casings or stabilizers 110, 114, 116, 118, 122, and 126.

Well integrity inspection system 100 combines at least one of modalities 310, 312, 314, and 316 with neutron and X-ray modalities 130 and 160 to extend interrogation beyond innermost casing 108 and stabilizer 110 to radially outward casings 112, 116, 120, and 124 and stabilizers 114, 116, 118, 122, and 126. For example, interrogation magnetic field generator modality 316 enables detection of defects in casing 108, but the specific size and shape of the defect may be difficult to assess with modality 316. Augmenting the results from magnetic field generator modality 316 with eddy current modality 312 enables defect gauging and estimation of its severity and danger to the integrity of casing 108.

As such, data or images obtained by different inspection modalities 302 can be synchronized in time or in space resulting in synthesized interrogation features, not available from the individual techniques. More specifically, data from neutron modality 130 and X-ray modality 160 can be combined algorithmically with measurements from at least one of conventional modalities 310, 312, 314, and 316 in order to determine a comprehensive analytical overview of a well integrity parameter of well structure 102.

Described herein is a well integrity inspection system configured to inspect a well structure having multiple concentric layers. The well integrity inspection system includes an inspection probe positioned in the well structure. The inspection probe includes a plurality of interrogation modalities that each have their own excitation assembly for transmitting a plurality of emissions into the well structure. At least two of the modalities include a neutron excitation assembly and a X-ray excitation assembly that are configured to interrogate radially outer layers of the well structure. The inspection probe also includes a plurality of detection assemblies configured to receive a plurality of return signals from the well structure. The plurality of detection assemblies includes at least a neutron detection assembly and an X-ray detection assembly that each receive backscatter radiation returns that have been modulated by the well structure. Data from the neutron detection assembly and the X-ray detection assembly is combined with data from at least one interrogation modality, such as, but not limited to, pulsed eddy currents, magnetic flux generation, and acoustic interrogation, to determine the integrity of the well structure.

The well integrity inspection improvements enabled by the well integrity inspection system described herein lead to safer, more environmentally sound operation of wells. The additional well casing structural information, providing earlier and more precise detection of cracks, corrosion, disbonding, and other defects, will serve to protect major aquifers and ground water zones from leakage and spills by fostering improved zonal isolation during drilling.

An exemplary technical effect of the methods, systems, and apparatus described herein includes at least one of: (a) a more accurate determination of a well integrity parameter using a combination of different interrogation modalities; and (b) interrogation of a well structure beyond the casing and stabilizer immediately surrounding the fluid flow conduit.

Exemplary embodiments of methods, systems, and apparatus for interrogating the integrity of a well structure are not limited to the specific embodiments described herein, but rather, components of systems and steps of the methods may be utilized independently and separately from other components and steps described herein. For example, the methods may also be used in combination with other interrogation systems to inspect a well structure, and are not limited to practice with only the well integrity inspection systems and methods as described herein. Rather, the exemplary embodiment can be implemented and utilized in connection with many other applications, equipment, and systems that may benefit from inspecting different depths of a structure.

Although specific features of various embodiments of the disclosure may be shown in some drawings and not in others, this is for convenience only. In accordance with the principles of the disclosure, any feature of a drawing may be referenced and claimed in combination with any feature of any other drawing.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A well integrity inspection system configured to inspect a well structure, the well structure including multiple concentric layers, said well integrity inspection system comprising:
   an inspection probe positioned in the well structure, said inspection probe comprising:
     a plurality of excitation assemblies configured to transmit a plurality of shaped radiation emissions into the well structure, wherein said plurality of excitation assemblies comprises at least a neutron excitation assembly and an X-ray excitation assembly; and
     a plurality of detection assemblies configured to receive a plurality of modulated backscatter radiation returns from the well structure, wherein said plurality of detection assemblies comprises at least a neutron detection assembly and an X-ray detection assembly; and
   a processor coupled to said inspection probe, said processor configured to determine a well integrity parameter of the well structure based on at least one of the plurality of modulated backscatter radiation returns;
   wherein the well structure further includes a fluid flow conduit, a plurality of concentric casings circumscribing the fluid flow conduit, and a plurality concentric stabilizer regions, each stabilizer region positioned between consecutive concentric casings, wherein said plurality of excitation assemblies transmits the plurality of radiation emissions into at least two consecutive concentric casings of the plurality of concentric casings and at least two concentric stabilizer regions of the plurality of concentric stabilizer regions.

2. The well integrity inspection system in accordance with claim 1, wherein said plurality of excitation assemblies further comprises at least one of a magnetic field generator, an ultrasound generator, and an eddy-current pulse generator.

3. The well integrity inspection system in accordance with claim 1, wherein each of said neutron excitation assembly and said X-ray excitation assembly comprises:
   an excitation generator; and
   a beam shaping device.

4. The well integrity inspection system in accordance with claim 3, wherein said excitation generator comprises a neutron generator and an X-ray generator.

5. The well integrity inspection system in accordance with claim 3, wherein said beam shaping device comprises a rotating sleeve configured to facilitate transmission of the plurality of radiation emissions along a predetermined path by substantially limiting transmission of the radiation emissions other than along the predetermined path.

6. The well integrity inspection system in accordance with claim 1, wherein each of said neutron detection assembly and said X-ray excitation detection assembly comprises:
   a radiation focusing element;
   a radiation transforming element;
   a radiation guiding element; and
   a detector.

7. The well integrity inspection system in accordance with claim 6, wherein said radiation focusing element comprises a collimator configured to align the plurality of backscatter radiation returns and guide the plurality of backscatter radiation returns toward said radiation transforming element.

8. The well integrity inspection system in accordance with claim 6, wherein said radiation transforming element comprises a scintillator material substantially extending about said radiation guiding element, said scintillator material configured to transform the plurality of high energy backscatter radiation returns into a plurality of low energy radiation for receipt by said detector.

9. The well integrity inspection system in accordance with claim 8, wherein said radiation guiding element comprises a waveguide configured to channel the plurality of low energy radiation from said scintillator material to said detector.

10. An inspection probe for interrogating the integrity of a well structure, the well structure including a plurality of alternating concentric casings and stabilizer regions, said inspection probe comprising:
    a neutron excitation assembly configured to transmit a beam of neutrons into the well structure;
    an X-ray excitation assembly configured to transmit a beam of X-rays into the well structure;
    a neutron detection assembly configured to receive a plurality of backscatter neutrons from the well structure;
    an X-ray detection assembly configured to receive a plurality of backscatter X-rays from the well structure;
    wherein said neutron excitation assembly comprises a neutron generator and a neutron beam shaping device;
    wherein said X-ray excitation assembly comprises an X-ray generator and an X-ray beam shaping device; and
    wherein said neutron beam shaping device and said X-ray beam shaping device each comprise a rotating sleeve configured to facilitate transmission of the beam of neutrons and the beam of X-rays along a predetermined path by substantially limiting transmission of the neutrons and the X-rays other than along the predetermined path.

11. The inspection probe in accordance with claim 10 further comprising at least one of a magnetic field generator, an ultrasound generator, and an eddy-current pulse generator.

12. The inspection probe in accordance with claim 10, wherein each of said neutron detection assembly and said X-ray excitation detection assembly comprises:
    a radiation focusing element;
    a radiation transforming element;
    a radiation guiding element; and
    a detector.

13. The well integrity inspection system in accordance with claim 12, wherein said radiation focusing element is coated with at least one layer of at least one material to enable total internal reflection that aligns the plurality of backscatter radiation returns and guide the plurality of backscatter radiation returns toward said radiation transforming element.

14. The inspection probe in accordance with claim 12, wherein said radiation transforming element comprises a scintillator material substantially extending about said radiation guiding element, said scintillator material configured to transform the pluralities of high-energy backscatter neutrons and high-energy backscatter X-rays into a plurality of low energy radiation for receipt by said detector.

15. The inspection probe in accordance with claim 14, wherein said radiation guiding element comprises a waveguide configured to channel the plurality of low energy radiation from said scintillator material to said detector.

16. A method of interrogating the integrity of a well structure having a plurality of alternating concentric casings and concentric stabilizer regions, said method comprising:
  inserting an inspection probe into an innermost casing of the well structure;
  transmitting a plurality of radiation emissions into the well structure using a plurality of excitation assemblies, wherein the plurality of excitation assemblies includes at least a neutron excitation assembly and an X-ray excitation assembly;
  receiving a plurality of backscatter radiation returns from the well structure using a plurality of excitation detection assemblies, wherein the plurality of detection assemblies includes at least a neutron detection assembly and an X-ray detection assembly; and
  determining a well integrity parameter of the well structure based on at least one of the plurality of backscatter radiation returns using a processor that is operatively coupled to the inspection probe;
  wherein transmitting a plurality of radiation emissions comprises shaping the plurality of radiation emissions with a rotating sleeve to facilitate transmitting the plurality of radiation emissions along a predetermined path by substantially limiting transmission of the plurality of radiation emissions other than along the predetermined path.

* * * * *